(12) United States Patent
Smith et al.

(10) Patent No.: US 10,526,713 B2
(45) Date of Patent: *Jan. 7, 2020

(54) ELECTROCHEMICAL ENHANCEMENT OF DETERGENT ALKALINITY

(71) Applicant: Ecolab USA Inc., Saint Paul, MN (US)

(72) Inventors: Kim R. Smith, Woodbury, MN (US); Erik C. Olson, Savage, MN (US)

(73) Assignee: Ecolab USA Inc., Saint Paul, MN (US)

( * ) Notice: Subject to any disclaimer, the term of this patent is extended or adjusted under 35 U.S.C. 154(b) by 214 days.

This patent is subject to a terminal disclaimer.

(21) Appl. No.: 14/557,496

(22) Filed: Dec. 2, 2014

(65) Prior Publication Data
US 2015/0094254 A1 Apr. 2, 2015

Related U.S. Application Data

(63) Continuation of application No. 13/038,705, filed on Mar. 2, 2011, now Pat. No. 8,937,037.

(51) Int. Cl.

| | | |
|---|---|---|
| *C02F 1/461* | (2006.01) | |
| *C11D 7/12* | (2006.01) | |
| *C25B 1/00* | (2006.01) | |
| *C25B 1/04* | (2006.01) | |
| *C25B 1/10* | (2006.01) | |
| *C25B 1/16* | (2006.01) | |

(52) U.S. Cl.
CPC .............. *C25B 1/10* (2013.01); *C11D 7/12* (2013.01); *C25B 1/00* (2013.01); *C25B 1/04* (2013.01); *C25B 1/16* (2013.01); *Y02E 60/366* (2013.01)

(58) Field of Classification Search
CPC ...................................................... C25B 1/16
See application file for complete search history.

(56) References Cited

U.S. PATENT DOCUMENTS

| | | |
|---|---|---|
| 3,963,592 A | 6/1976 | Lindstrom |
| 4,357,217 A | 11/1982 | Kuehn et al. |
| 4,384,931 A | 5/1983 | Jasinski et al. |
| 4,393,038 A | 7/1983 | Sun et al. |
| 4,430,176 A | 2/1984 | Davison |
| 4,455,203 A | 6/1984 | Stucki |
| 4,533,443 A | 8/1985 | Wrighton et al. |
| 4,561,945 A | 12/1985 | Coker et al. |
| 4,572,774 A | 2/1986 | Wrighton et al. |
| 4,576,756 A | 3/1986 | Wrighton et al. |
| 4,753,718 A | 6/1988 | Chiang |

(Continued)

OTHER PUBLICATIONS

Genders, Davie "Electrochemical Salt Splitting", Electrosynthesis, Watts, New Quarterly Newsletter Sep. 1995, vol. 1, No. 1, Lancaster, New York.

*Primary Examiner* — Ling Siu Choi
*Assistant Examiner* — Thuy-Ai N Nguyen
(74) *Attorney, Agent, or Firm* — McKee, Voorhees & Sease, PLC

(57) ABSTRACT

A device for in-situ production of caustic and increasing alkalinity of a detergent and methods for increasing alkalinity of a detergent are disclosed. In particular, in situ electrochemical conversion of bicarbonate, sesquicarbonate or carbonate sources into caustic provides a safe means for increasing alkalinity of a detergent for a variety of cleaning applications. The invention further discloses methods for cleaning using the electrochemically enhanced detergent according to the invention.

16 Claims, 7 Drawing Sheets

(56) References Cited

U.S. PATENT DOCUMENTS

| | | |
|---|---|---|
| 4,758,317 A | 7/1988 | Chiang |
| 5,074,975 A | 12/1991 | Oloman et al. |
| 5,098,532 A | 3/1992 | Thompson et al. |
| 5,112,702 A | 5/1992 | Berzins et al. |
| 5,246,551 A | 9/1993 | Pletcher et al. |
| 5,358,609 A | 10/1994 | Drackett |
| 5,565,073 A | 10/1996 | Fraser et al. |
| 5,645,700 A | 7/1997 | White et al. |
| 5,702,585 A | 12/1997 | Hillrichs et al. |
| 5,882,501 A | 3/1999 | Foller et al. |
| 5,900,133 A | 5/1999 | Foller et al. |
| 5,904,829 A | 5/1999 | Foller et al. |
| 5,906,722 A | 5/1999 | Foller et al. |
| 6,045,684 A | 4/2000 | Wakita et al. |
| 6,159,349 A | 12/2000 | Wakita et al. |
| 6,254,762 B1 | 7/2001 | Uno et al. |
| 6,274,114 B1 | 8/2001 | Ledon et al. |
| 6,375,824 B1 | 4/2002 | Phinney |
| 6,375,920 B2 | 4/2002 | Fischer et al. |
| 6,569,309 B2 | 5/2003 | Otsuka et al. |
| 6,592,840 B1 | 7/2003 | Fischer et al. |
| 6,685,818 B2 | 2/2004 | Lehmann et al. |
| 6,692,716 B1 | 2/2004 | Phinney |
| 6,695,963 B2 | 2/2004 | Otsuka et al. |
| 6,712,949 B2 | 3/2004 | Gopal |
| 6,761,815 B2 | 7/2004 | Nakajima et al. |
| 6,767,447 B2 | 7/2004 | Uno et al. |
| 6,773,575 B2 | 8/2004 | Nakajima et al. |
| 6,913,844 B2 | 7/2005 | Butcher et al. |
| 2005/0252538 A1 | 11/2005 | Vernon et al. |
| 2009/0205973 A1* | 8/2009 | Monzyk .................. C25B 1/00 205/548 |
| 2011/0067732 A1 | 3/2011 | Smith et al. |

\* cited by examiner

ELECTROCHEMICAL ENHANCEMENT OF DETERGENT ALKALINITY

CROSS REFERENCE TO RELATED APPLICATIONS

This is a Continuation application of U.S. Ser. No. 13/038,705 filed Mar. 2, 2011, herein incorporated by reference in its entirety.

FIELD OF THE INVENTION

The invention pertains to the field of electrochemistry and more particularly, a device and methods for in situ electrochemical enhancement of alkalinity through the conversion of bicarbonate, sesquicarbonate, or carbonate into caustic. In particular, a device and methods for the electrochemical conversion of bicarbonate, sesquicarbonate, or carbonate into caustic provides a means of safely increasing the alkalinity of detergents and providing safe-to-handle, low pH detergent compositions for use in combination with caustic generated in situ for a variety of cleaning applications, including for example ware wash and laundry.

BACKGROUND OF THE INVENTION

Electrochemical cells are used for a variety of purposes. For example, electrochemical cells may be used for water treatment processes in order to produce two forms of altered water: reduced or alkaline water and oxidized or acidic water. Electrochemical cells may also be used to produce hypochlorite solutions or chlorine for bleaches, surface sanitizers and other disinfectants. The electrolysis of salt to generate chlorine is also well established. In addition, electrochemical cells are used for the conversion of sodium carbonate into sodium hydroxide. See e.g. U.S. Pat. No. 5,246,551.

Conventional electrolysis cells are equipped with at least an anode and a cathode and often have a dual structure in which the anode and cathode are separated by one or more membranes to divide the cells into chambers, including an anode chamber and a cathode chamber. A barrier membrane provides the advantage of preventing the products in the anode chamber from mixing with the products from the cathode chamber. Various electrolysis cells and methods for electrolyzing water for various purposes are disclosed, for example in U.S. Pat. Nos. 3,616,355, 4,062,754, 4,100,052, 4,761,208, 5,313,589, and 5,954,939. Depending upon the structure of an electrochemical cell, various effluents are generated.

On-site production of enhanced alkalinity products such as detergents are desirable, in order to decrease or eliminate the need to transport caustic products and/or diluted aqueous solutions of the caustic products which both increase the cost of transporting chemicals. In addition, the on-site production of enhanced alkalinity products significantly reduces the safety concerns associated with the transport and handling of highly alkaline cleaning compositions which present dangers due to the caustic nature of the chemicals capable of causing burns to exposed skin, particularly in the concentrated form. As the alkalinity of the compositions increases, the possible risk to workers also increases. Great care must therefore be taken to protect workers who handle highly alkaline cleaning compositions. As a result, there is a need to provide in situ methods of enhancing the alkalinity of detergents and cleaning compositions in order to reduce or alleviate these concerns.

Highly alkaline cleaning compositions provide the ability to clean in various applications. For example, alkaline cleaners are effective as grill and oven cleaners, ware wash detergents, laundry detergents, laundry presoaks, drain cleaners, hard surface cleaners, surgical instrument cleaners, transportation vehicle cleaning, dish wash presoaks, dish wash detergents, beverage machine cleaners, concrete cleaners, building exterior cleaners, metal cleaners, floor finish strippers, degreasers and burned-on soil removers. In a variety of these applications, cleaning compositions having a very high alkalinity are most desirable and efficacious. For example, floor stripping compositions for removal of floor finishes are most effective at a highly alkaline pH.

Accordingly, it is an objective of the invention to formulate improved methods and devices for in situ production of enhanced alkalinity through the conversion of bicarbonate, sesquicarbonate, or carbonate into caustic.

It is an objective of the invention to provide efficient and economic methods for electrochemical enhancement of alkalinity without coproduction of chlorine and acids.

It is a further objective of the invention to reduce the safety concerns and costs associated with transporting caustic products.

BRIEF SUMMARY OF THE INVENTION

The invention relates in general to in situ electrochemical processes for the increase in alkalinity of detergent sources for use in a variety of cleaning applications. More particularly, the present invention relates to methods for increasing alkalinity of a detergent, a device for in-situ production of caustic and increasing alkalinity of a detergent and a method for cleaning using an electrochemically enhanced detergent.

According to an embodiment of the invention, a method for increasing alkalinity of a detergent includes providing an electrochemical cell, introducing an electrolyte solution to the electrochemical cell, wherein said solution comprises a water or detergent composition as a catholyte and an anolyte selected from the group consisting of an alkali metal carbonate, alkali metal bicarbonate, alkali metal sesquicarbonate and mixtures thereof, and applying an electric current across the anode and cathode for electrochemical production of hydroxide and hydrogen at said cathode and carbon dioxide and water at said anode. According to an embodiment, the electrochemical cell is configured with at least one hydrogen consuming anode, at least one hydroxide producing cathode and an ion-selective membrane.

According to further embodiments of the invention, the catholyte is a detergent composition such that the electrochemical production of hydroxide increases the pH of the detergent to at least 10, preferably at least 12. The detergent composition may be carbonate-free and may further have a neutral pH prior to the electrochemical alkalinity enhancement. According to an alternative embodiment of the invention, the catholyte is water and a detergent composition is introduced to the hydroxide outside of the electrochemical cell in order to increase the pH of the detergent to at least 10, preferably at least 12. The detergent according to the embodiments of the invention provide a source of an alkali metal carbonate, alkali metal bicarbonate, alkali metal sesquicarbonate or mixtures thereof.

According to an embodiment of the invention, a device for in-situ production of caustic and increasing alkalinity of a detergent includes an electrochemical cell, an electrolyte solution source comprising a water or detergent composition as a catholyte and an anolyte selected from the group consisting of an alkali metal carbonate, alkali metal bicarbonate, alkali metal sesquicarbonate and mixtures thereof, and an outlet for dispensing a product stream of either caustic or detergent having an increased pH of at least 10 exiting from the electrochemical cell. According to an embodiment, the device outlet may be in fluid communication with a cleaning system such as a ware wash machine.

According to an embodiment the electrochemical cell is configured with at least one hydrogen consuming anode, at least one hydroxide producing cathode and an ion-selective membrane, wherein an electric current is applied across said anode and cathode for electrochemical production of hydroxide and hydrogen at said cathode and carbon dioxide and water at said anode. According to further embodiments the ion-selective membrane is a micro porous membrane, micro porous diaphragm or a cation exchange membrane. According to additional embodiments of the invention, the anode of the electrochemical cell may be steel and said cathode is titanium.

According to an embodiment of the invention, a method for cleaning using an electrochemically enhanced detergent includes obtaining a detergent composition having an increased pH of at least 10 from an electrochemical cell and contacting an article with the electrochemically enhanced detergent, such that the article is cleaned.

DETAILED DESCRIPTION OF THE PREFERRED EMBODIMENT

Figure 1:
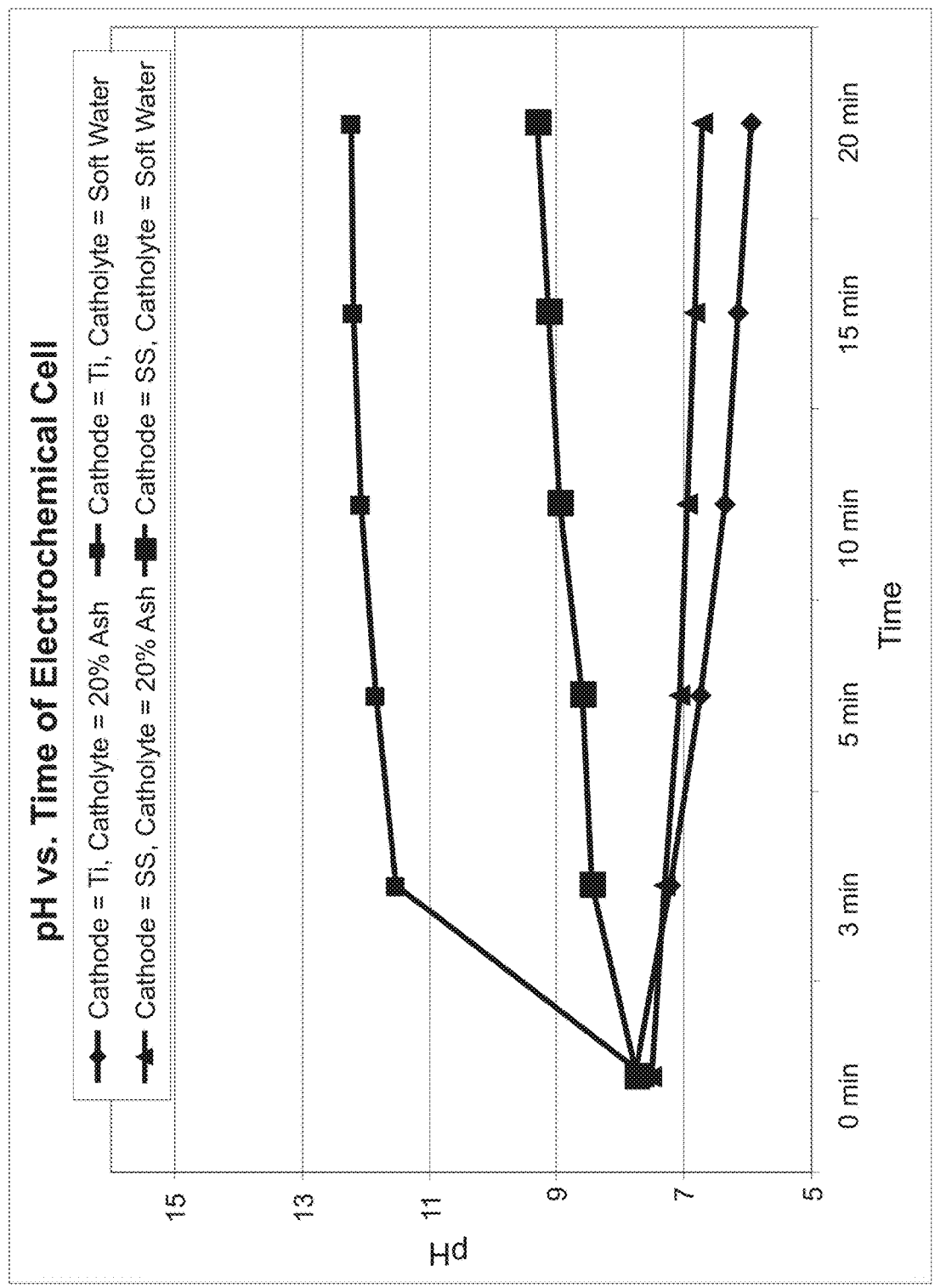
FIG. 1 shows the impact of variations of electrodes and catholyte solutions on pH obtained from an electrochemical cell.

The present invention relates to in situ electrochemical processes for the enhancement in alkalinity of detergent sources for use in a variety of cleaning applications. In some aspects, the present invention relates to methods for increasing alkalinity of a detergent. In particular, the methods of in situ alkalinity enhancement allow the use of a carbonate source to electrochemically enhance the alkalinity of the detergent. The methods and device for performing the methods according to the invention provide the opportunity to convert detergents into a carbonate-free super concentrate product that has reduced shipping costs and use volume. In an additional aspect, a method for cleaning using an electrochemically enhanced detergent is disclosed. In this manner, the methods and devices of the present invention allow in-situ production of enhanced alkalinity for on-site use and production of highly alkaline detergents for a variety of cleaning applications, obviating the need for transportation of highly alkaline cleaning agents.

The embodiments of this invention are not limited to particular devices and/or methods for electrochemical enhancement of detergent alkalinity, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in their SI accepted form. Numeric ranges recited within the specification are inclusive of the numbers defining the range and include each integer within the defined range.

Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities referred and variations in the numerical quantities that can occur.

As used herein, the terms "builder," "chelating agent," and "sequestrant" refer to a compound that forms a complex (soluble or not) with water hardness ions (from the wash water, soil and substrates being washed) in a specific molar ratio. Chelating agents that can form a water soluble complex include sodium tripolyphosphate, EDTA, DTPA, NTA, citrate, and the like. Sequestrants that can form an insoluble complex include sodium triphosphate, zeolite A, and the like. As used herein, the terms "builder," "chelating agent" and "sequestrant" are synonymous.

As used herein, the term "cleaning" means to perform or aid in soil removal, bleaching, microbial population reduction, or combinations thereof.

As used herein, the terms "feed water" and "water" refer to any source of water that can be used with the methods, systems and apparatus of the present invention. Exemplary water sources suitable for use in the present invention include, but are not limited to, water from a municipal water source, or private water system, e.g., a public water supply or a well. The water can be city water, well water, water supplied by a municipal water system, water supplied by a private water system, and/or water directly from the system or well. The feed water can also include water from a used water reservoir, such as a recycle reservoir used for storage of recycled water, a storage tank, or any combination thereof. In some embodiments, the water source is from the sump of a mechanical washing device such as a dishwasher. In some embodiments, the water source is from a dispenser for a solid block of feedstock. In some embodiments, the water source is not industrial process water, e.g., water produced from a bitumen recovery operation. In other embodiments, the water source is not a waste water stream.

As used herein, the term "hard surface" includes showers, sinks, toilets, bathtubs, countertops, windows, mirrors, transportation vehicles, floors, and the like.

The term "hard water," as used herein, refers to water having a level of calcium and magnesium ions in excess of about 100 ppm. Often, the molar ratio of calcium to magnesium in hard water is about 2:1 or about 3:1. Although most locations have hard water, water hardness tends to vary from one location to another. Further, as used herein, the term "solubilized water hardness" refers to hardness minerals dissolved in ionic form in an aqueous system or source, i.e., $Ca^{++}$ and $Mg^{++}$. Solubilized water hardness does not refer to hardness ions when they are in a precipitated state, i.e., when the solubility limit of the various compounds of calcium and magnesium in water is exceeded and those compounds precipitate as various salts such as, for example, calcium carbonate and magnesium carbonate. Salts formed from water hardness ions have low solubility in water as they are formed by metal cations interacting with inorganic anions. As concentration in a solution increases and/or temperature or pH of a water source increases, the salts will precipitate from solution, crystallize and form hard deposits or scales on surfaces, causing the undesirable effects on equipment such as electrochemical cells. A threshold inhibitor or threshold agent (as used synonymously) inhibits the crystallization of water hardness ions from solution, without necessarily forming a specific complex with the water hardness ion, thereby inhibiting the scaling, film and/or residue traditionally observed in cells. Not wishing to be limited by theory, it is believed that the threshold inhibitors work by interfering with the growth of the scale crystals.

As used herein, the term "laundry," refers to woven and non-woven fabrics, and textiles. For example, laundry can include, but is not limited to, clothing, bedding, towels and the like.

As used herein, the term "phosphate-free" or "substantially phosphate-free" refers to a composition, mixture, or ingredient that does not contain a phosphate or phosphate-containing compound or to which a phosphate or phosphate-containing compound has not been added. Should a phosphate or phosphate-containing compound be present through contamination of a phosphate-free composition, mixture, or ingredients, the amount of phosphate shall be less than about 1.0 wt-%. In some embodiments, the amount of phosphate is less than about 0.5 wt-%. In other embodiments, the amount of phosphate is less then about 0.1 wt-%. In still yet other embodiments, the amount of phosphate is less than about 0.01 wt-%.

As used herein, the term "phosphorus-free" or "substantially phosphorus-free" refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than about 1.0 wt-%. In some embodiments, the amount of phosphorous is less than about 0.5 wt-%. In other embodiments, the amount of phosphorus is less than about 0.1 wt-%. In still yet other embodiments, the amount of phosphorus is less than about 0.01 wt-%.

The terms "scale," "scaling," "film," and "filming" as used herein, may exemplarily refer to either bicarbonate, carbonate, sulfate, phosphate or hydroxide scaling, caused by salts of bicarbonate, carbonate, sulfate, phosphonate and/or hydroxide with calcium, magnesium, or other metal ions as observed in an electrochemical cell and described herein. Scaling as discussed herein and alleviated according to the threshold agent compositions and methods of the present invention are distinct from cell corrosion. Corrosion of an electrochemical cell generally refers to the gradual weight loss of metallic components through a chemical process or series of chemical reactions. Most often metals that come into prolonged contact with aqueous systems containing oxidants (such as chlorine, acid, bleach, caustic, etc.) are prone to corrosion. In an electrochemical cell, distinct from scaling, corrosion most frequently occurs at the anode due to the more acidic conditions.

As used herein, the term "solubilized water hardness" refers to hardness minerals dissolved in ionic form in an aqueous system or source, i.e., Ca++ and Mg++. Solubilized water hardness does not refer to hardness ions when they are in a precipitated state, i.e., when the solubility limit of the various compounds of calcium and magnesium in water is exceeded and those compounds precipitate as various salts such as, for example, calcium carbonate and magnesium carbonate.

The terms "threshold agent" and "threshold inhibiting agent," as used herein, refer to a compound that inhibits crystallization of water hardness ions from solution, but that need not form a specific complex with the water hardness ion. Threshold agents are capable of maintaining hardness ions in solution beyond its normal precipitation concentration. See e.g., U.S. Pat. No. 5,547,612. This distinguishes a threshold agent from a chelating agent or sequestrant; however, according to the invention the threshold agent may be either a chelating agent and/or sequestrant. Threshold agents may include, for example and without limitation, polycarboxylates, such as polyacrylates, polymethacrylates, olefin/maleic copolymers, and the like. The threshold agent according to the invention must survive the electrochemical cell's conditions to ensure it is not deactivated and prevented from inhibiting scaling, and further must not cause any decrease in chlorine generation. As used herein, the terms "chelating agent" and "sequestrant" refer to a compound that forms a complex (soluble or not) with water hardness ions (from the wash water, soil and substrates being washed) in a specific molar ratio. According to the invention, the threshold agent is preferably characterized as substoichiometric, such that the threshold agent is effective at concentration levels that are lower than would be expected based on a stoichiometric equivalence of the threshold agent and the scale-causing component present in the electrochemical cell or treated water source.

As used herein, the term "ware" refers to items such as eating and cooking utensils and other hard surfaces such as showers, sinks, toilets, bathtubs, countertops, windows, minors, transportation vehicles, and floors. As used herein, the term "ware washing" refers to washing, cleaning, or rinsing ware.

The term "water soluble," as used herein, refers to a compound that can be dissolved in water at a concentration of more than 1 wt-%.

The term "water insoluble," as used herein, refers to a compound that can be dissolved in water only to a concentration of less than 0.1 wt-%. For example, magnesium oxide is considered to be insoluble as it has a water solubility (wt %) of about 0.00062 in cold water, and about 0.00860 in hot water. Other insoluble compounds include, for example: magnesium hydroxide with a water solubility of 0.00090 in cold water and 0.00400 in hot water; aragonite with a water solubility of 0.00153 in cold water and 0.00190 in hot water; and calcite with a water solubility of 0.00140 in cold water and 0.00180 in hot water. The terms "slightly soluble" or "slightly water soluble," as used herein, refer to a compound that can be dissolved in water only to a concentration of 0.1 to 1.0 wt-%.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods, device, systems or apparatuses of the present invention can include, consist essentially of, or consist of the component and ingredients of the present invention as well as others described herein for the electrochemical conversion of sources of alkalinity, including use of a detergent source to convert soda ash into caustic. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

The use of electrochemistry to convert a source of sodium carbonate into sodium hydroxide is known in the art. However, according to the invention, a neutral detergent stream may be unexpectedly used as a single feedstock to an electrochemical cell in order to convert soda ash into caustic, generating active alkalinity and overcoming the inability of those skilled in the art to produce sufficiently pure grades of caustic soda. Surprisingly, an alkaline source is not required for the production of alkalinity using the electrochemical cell and methods according to the invention. According to the invention, the detergent stream (including a neutral detergent stream) provides a source of carbonate to be converted into caustic. According to a further embodiment of the invention, the detergent is introduced into an electrochemical cell with a separate stream used as the carbonate source. As a result, a detergent composition can be electrochemically enhanced so that the alkalinity of a detergent, such as a neutral pH detergent, is increased significantly. In addition, the invention provides the opportunity to convert detergents into carbonate-free, super concentrated product that may subsequently be enhanced with hydroxide produced from an electrochemical cell in situ. The benefits of the invention significantly reduce shipping costs, enhance the alkalinity of reduced use volumes of detergent compositions and provide flexibility for the production of enhanced alkalinity detergents in situ having desired pH ranges for particular cleaning applications.

Electrochemical Cell

The present invention provides methods and a device, system or apparatus for increasing alkalinity of a detergent or in-situ production of caustic to increase the alkalinity of a detergent using an electrochemical cell. Exemplary electrochemical units include, but are not limited to those described U.S. Pat. Nos. 5,246,551, 5,882,501, 5,906,722, 5,900,133, 5,904,829, 6,375,824, 6,569,309, 6,692,716, 6,695,963, 6,913,844, 6,773,575, 6,767,447, 6,761,815 and 6,712,949. The entire contents of each of these patents are hereby incorporated herein by reference in its entirety. However, the methods, devices, systems or apparatus for enhancing alkalinity according to the invention is not intended to be limited according to particular structures of an electrochemical unit. One skilled in the art understands the relationship between the structure of an electrochemical unit and the effluents produced. For example, a unit divided by a membrane produces both oxidizing agents and caustic. The structure of an electrochemical cell may be adapted based upon the desired pH of the effluent according to the following embodiments of the invention.

According to an embodiment of the invention, the electrochemical cell is configured with at least one hydrogen consuming anode and at least one hydroxide producing cathode, wherein an electric current applied across the anode and cathode to enable the electrochemical production of hydroxide and hydrogen at the cathode and carbon dioxide and water at the anode. Preferably, the anode of the electrochemical cell is constructed of steel, stainless steel, ruthenium, or a surface coated with the metals. Preferably, the cathode of the electrochemical cell is constructed of titanium, ruthenium, a Hastalloy alloy, or a surface coated with these metals. According to a preferred embodiment, the anode of the electrochemical cell is constructed of steel and the cathode is constructed of titanium. Preferably, the electrodes of the electrochemical cell are in the form of either plates or metal screens. One skilled in the art will appreciate the numerous potential cell configurations (i.e. stacked plate, tubular, jelly roll, etc.) which are suitable for use according to the electrochemical cell of the present invention.

According to a preferred embodiment, the electrochemical cell comprises at least two chambers. Preferably, the at least one hydrogen consuming anode hydroxide producing cathode are separated by an ion-selective membrane. In a preferred embodiment, the ion-selective membrane is a micro porous membrane, a micro porous diaphragm, or a micro porous membrane laminate, such as the Goretex membrane commercially-available from G. L. Gore. In a further preferred embodiment, the ion-selective membrane is a cation exchange membrane capable of restricting the passage of carbonate, bicarbonate or sesquicarbonate ions from passing into the catholyte compartment as well as restricting the passage of hydroxide into the anolyte compartment, while simultaneously permitting the passage of alkali metal cations. Additional description of exemplary types of electrochemical cell structure suitable for use according to the invention is disclosed in U.S. Pat. No. 5,246,551, which is herein incorporated by reference in its entirety.

According to an embodiment of the invention, the electrochemical cell is provided an electrolyte solution source. Preferably, the electrolyte solution comprises either a water source or a detergent composition as a catholyte. According to a further embodiment, a detergent catholyte is carbonate-free and the cell produces hydroxide increasing the pH of the detergent to at least 9, preferably at least 10, preferably at least 12, more preferably at least 13 at most preferably approximately 14. According to additional embodiments of the invention, a detergent is increased to a pH of from about 9 to about 14, preferably to a pH of at least 10. Preferably, the electrolyte solution further comprises an anolyte selected from the group consisting of an alkali metal carbonate, alkali metal bicarbonate, alkali metal sesquicarbonate and mixtures thereof.

The electrolyte solution source according to the invention may be provided by a single source (i.e. single input stream) or a double source (i.e. double input stream) into the electrochemical cell. According to an embodiment, the electrolyte solution source may be provided to the electrochemical cell by a single input stream of a detergent composition, wherein the detergent provides a source of an alkali metal carbonate, alkali metal bicarbonate, alkali metal sesquicarbonate and mixtures thereof for both the anolyte and catholyte. According to a further embodiment of the invention, the electrolyte solution source may be provided to the electrochemical cell by a double (or multiple) input stream, wherein the catholyte is a water source and the anolyte is a source of an alkali metal carbonate, alkali metal bicarbonate, alkali metal sesquicarbonate and mixtures thereof.

In discussing the various embodiments of the invention the production of caustic (or caustic soda) shall be understood to refer to sodium hydroxide. According to the invention and the various embodiments of the invention, one skilled in the art will understand that the reference to production of caustic or sodium hydroxide shall also refer to the specific products relating to the particular electrolyte solutions utilized. For example, the methods and devices described herein are intended to relate to the detergent compositions and/or sources of alkali metal carbonate, alkali metal bicarbonate, alkali metal sesquicarbonate and mixtures thereof. The alkali metals include for example, sodium, potassium and lithium. According to an embodiment of the invention, alkali metal hydroxides and hydrogen are produced at the cathode and water and carbon dioxide are produced at the anode as shown by the following chemical reactions:

(Cathode) $2H_2O \rightarrow 2OH^- + H_2$ (Anode) $Na_2CO_3 + H_2 \rightarrow 2Na^+ + H_2O + CO_2$ (Overall) $Na_2CO_3 + H_2O \rightarrow 2NaOH + CO_2$ Device According to an embodiment of the invention a device for in-situ production of caustic and increasing alkalinity of a detergent is disclosed. The device may comprise, consist of or consist essentially of an electrochemical cell with an electrolyte solution source for the electrochemical cell, wherein the electrolyte solution comprises a water or detergent composition as a catholyte and an anolyte selected from the group consisting of an alkali metal carbonate, alkali metal bicarbonate, alkali metal sesquicarbonate and mixtures thereof, and an outlet for dispensing a product stream of either caustic or detergent.

According to the invention, the electrochemical cell may be configured according to the various embodiments disclosed herein, including the preferred embodiments of having at least one hydrogen consuming anode of steel, at least one hydroxide producing titanium cathode and an ion-selective membrane, wherein the membrane is a micro porous membrane, micro porous diaphragm or a cation exchange membrane, wherein an electric current is applied across said anode and cathode for electrochemical production of hydroxide and hydrogen at said cathode and carbon dioxide and water at said anode.

According to certain embodiments of the invention, the device may be combined with a dispenser in fluid communication with the electrochemical cell. According to an embodiment, the dispenser provides an electrolyte solution comprising a detergent composition with a source of an alkali metal carbonate, alkali metal bicarbonate, alkali metal sesquicarbonate or combinations to be provided to the electrochemical cell.

According to a further embodiment the outlet from the device may be in fluid communication with a cleaning system to provide an enhanced alkalinity detergent composition. According to such an embodiment, the dispenser provides a detergent composition having a pH of at least 10, preferably at least 12 as a result of the caustic increasing the alkalinity of said detergent composition.

According to a still further embodiment of the invention, the outlet from the device may be in fluid communication with a dispenser housing a detergent composition to be combined with the caustic produced by the electrochemical cell to provide to a cleaning system an enhanced alkalinity detergent composition having a pH of at least 10, preferably at least 12. According to this embodiment of the invention, the detergent composition may be carbonate-free and essentially a neutral pH, such that the increased pH is a result of the electrochemical production of hydroxide combined with the detergent composition.

Alternatively, the device may be combined with a dispenser that is a modified detergent dispenser, wherein an electrochemical cell is built-in to such dispenser. According to a further embodiment, a washing machine or other washing system has an electrochemical cell built-in. In some embodiments, the washing system is selected from the group consisting of a ware washing system, a laundry washing system, a vehicle washing system, a clean in place washing system, and combinations thereof.

According to an embodiment of the invention, modifications to the device comprising the electrochemical cell may be made. A cell modification may comprise, consist of or consist essentially of the use of air injection to reduce the power demand of a cell. According to an embodiment of the invention, an oxygen-containing gas or source, such as air, may be passed through a chamber of a cell to decrease voltage requirements and/or increase chemical generation from a cell. Further description of this embodiment is disclosed in related application Ser. No. 13/076,920, filed Mar. 31, 2011, entitled Bubbling Air Through an Electrochemical Cell to Increase Efficiency. The entire contents of this patent application are hereby expressly incorporated herein by reference including, without limitation, the specification, claims, and abstract, as well as any figures, tables, or drawings thereof.

Methods of Enhancing Alkalinity

According to an embodiment of the invention, a method for increasing alkalinity of a detergent includes providing an electrochemical cell configured with at least one hydrogen consuming anode, at least one hydroxide producing cathode and an ion-selective membrane, introducing an electrolyte solution into the electrochemical cell, and applying an electric current across the anode and cathode for electrochemical production of hydroxide and hydrogen at said cathode and carbon dioxide and water at said anode. According to the embodiments of the invention, the electrolyte solution may include either a water or detergent composition as a catholyte solution an alkali metal carbonate source, alkali metal bicarbonate source, alkali metal sesquicarbonate source or mixtures thereof as the anolyte solution.

The methods of enhancing alkalinity according to the invention convert a source of carbonate, bicarbonate or sesquicarbonate into caustic. As set forth in the various embodiments of the invention, a detergent stream may be used as a single feedstock to an electrochemical cell in order to convert soda ash into caustic. According to a further embodiment of the invention, the detergent may be introduced into an electrochemical cell with a separate stream used as the carbonate source. As a result, a detergent composition can be electrochemically enhanced so that the alkalinity of a detergent, such as a neutral pH detergent, is increased significantly.

The methods of enhancing alkalinity according to the invention further allow the use of caustic generated from carbonate in situ to be combined with a separate detergent use stream. According to this embodiment, the newly formed caustic may be stored, for example at a point of use in a sump, or immediately combined with a detergent composition to provide such detergent with enhanced alkalinity. As a result, the invention provides the opportunity to convert detergents that are carbonate-free, super concentrated products into a highly alkaline composition as a result of the combination of hydroxide produced in situ by an electrochemical cell with a neutral pH detergent.

According to embodiments of the invention, the method for increasing alkalinity of a detergent result in an increase of pH of detergent composition to at least 10. More preferably, the methods for increasing alkalinity of a detergent result in an increase of pH of a detergent composition to a pH of at least 12. According to a further embodiment, the detergent composition may be carbonate-free and/or have a neutral pH.

Methods of Use

According to an embodiment of the invention, a method for cleaning using an electrochemically enhanced detergent is disclosed and includes obtaining a detergent composition having an increased pH of at least 10 from an electrochemical cell and contacting an article with the electrochemically enhanced detergent, such that the article is cleaned. According to a further embodiment, a method for cleaning using an electrochemically enhanced detergent includes contacting a detergent composition with a source of alkalinity having an increased pH obtained from an electrochemical cell and contacting an article with the electrochemically enhanced detergent. The detergent composition is preferably a neutral pH detergent, wherein the pH of the detergent is increased to at least 10, preferably at least 12, with the addition of the electrochemically produced caustic composition.

The enhanced alkalinity detergent or caustic solution to be combined with a detergent composition is provided to at least one article or system in need of cleaning. According to an embodiment of the invention, an article or articles to be cleaned are contacted with a use solution obtained according to the methods of the invention, such that the article(s) is cleaned. In some embodiments, the method further comprises rinsing the article. The article can be rinsed with treated water, treated softened water, or with untreated water. A rinse aid can also be applied to the article after it has been washed.

Any automatic or manual washing system that would benefit from the use of the methods according to the present invention can be used. These include a variety of industrial (commercial) and domestic (residential) applications. For example, a method, system, or apparatus of the present invention can be to provide either alkalinity or enhanced alkalinity detergents to be used in: ware washing applications, e.g., washing eating, instruments and cooking utensils; in hard surfaces cleaning, such as showers, sinks, toilets, bathtubs, countertops, windows, minors, and floors; in laundry applications, e.g., automatic textile washing machines; in vehicle care and carwash applications; industrial applications; in food service and food processing applications; in bottle washing applications; in clean-in-place applications; and in healthcare instrument care applications, such as surgical instrument cleaning.

In some embodiments, the methods of cleaning according to the invention can be applied at the point of use. A point of use may include any cleaning application wherein pH adjustment of a use solution or detergent is desired. For example, a method, system, device or apparatus of the invention can be applied to a water source upstream of an application such as a washing system. In some embodiments, the water is passed through the one or more cleaning components immediately prior to the desired end use of the water source. For example, an apparatus of the invention could be employed to a water line connected to a household or restaurant appliance, e.g., a dishwashing or ware washing machine. In addition, the system, device or apparatus employing the methods of the present invention may be located in a washing system.

A device, apparatus or system according to embodiments of the invention may be used with a washing system in a variety of ways. In some embodiments, the device, apparatus or system may be connected to a detergent dispensing device, such that a neutral detergent composition is combined with the caustic source to provide an on-site generated enhanced alkalinity detergent composition. The device, apparatus or system may be used to supply water containing an enhanced alkalinity detergent (such as a use solution of an enhanced alkalinity detergent composition) to a washing system. In some embodiments, the device, apparatus or system may be used to supply a mixture of water, enhanced alkalinity detergent composition and/or an additional ingredient(s), e.g., surfactant, to a washing system.

In Situ Cleaning System

An electrochemical cell according to the present invention may be provided with an in situ cleaning system, as further described in U.S. Ser. No. 12/887,755, entitled In-Situ Cleaning System. The entire contents of this patent application are hereby expressly incorporated herein by reference, including, without limitation, the specification, claims, and abstract, as well as any figures, tables, or drawings thereof. The electrochemical cell according to the invention may be provided within an in situ cleaning system comprising, consisting of or consisting essentially of a water treatment component (such as a threshold agent, catalytic system, conversion agents, resin materials and filtration systems). According to an additional embodiment of the invention, the electrochemical cell according to the invention may be provided within an in situ cleaning system comprising, consisting of or consisting essentially of a water treatment component and an alkalinity generating components (such as a decomposition agent).

Water Treatment Component

According to an embodiment of the invention, the in situ cleaning system comprising an electrochemical cell further comprises, consists of or consists essentially includes a water treatment component. A water treatment component is provided to the system, for example, to reduce the amount of solubilized hardness in a water source. Without being limited to a particular theory, the water treatment component reduces solubilized hardness in water, thereby reducing the amount of or eliminating the need for chelating agents, sequestering agents, conventional builders, chelating agent, threshold agents and/or phosphorous needed in a detergent or cleaning agent supplied to a washing system according to the invention. As a result, use of a water treatment component in the in situ cleaning systems according to the invention minimizes the amount of chemicals added to the resulting cleaning agent compared to non-treated water sources and increases the efficacy of the cleaning agent. In addition, use of a water treatment component according to the invention reduces the amount of hard water deposits, scales, and build up occurring on surfaces contacted by a feed water, providing an additional benefit of reducing the need to clean the in situ cleaning system itself.

Suitable water treatment components for use in the methods and systems according to the invention may include for example, threshold agent systems, catalytic systems, conversion agent systems, resin materials, filtration systems, and/or alkaline sources, as are each described further in this application. Preferred embodiments of the invention employing water treatment components do not require softening water. According to an embodiment, water treatment components according to the invention reduce a source of solubilized water hardness in the feed water. Preferred embodiments provide unsoftened water for use in the in situ cleaning systems of the invention. Preferred embodiments of the invention include the use of an unsoftened water source that is subsequently treated by one or more of the following water treatment components as described according to the invention.

Threshold Agents

Threshold agents may be used according to the device and methods of the present invention in order to minimize or eliminate the failure of electrodes and membranes of the electrochemical cells caused by both corrosion and hard water scaling. It is well understood that the longevity of electrodes and membranes of electrochemical cells are significantly diminished due to scaling and/or corrosion. See e.g., U.S. Pat. No. 4,248,690. Most often, calcium and magnesium ions are contained in either the water source or salt solutions added to electrochemical cells, resulting in the previously considered unavoidable scaling in cells, resulting in detrimental effects to the cells by forming hydroxide precipitates and scale. The precipitate and scale eventually coat the surface of the electrodes and membranes causing an increased voltage demand by the cell and may potentially lead to short-circuiting of the cell. The device and methods of the present invention overcome these significant disadvantages to using electrochemical cells along with eliminating the need to use softened water, chelating agents and/or sequestrants through the use of a threshold agent. Further description of threshold agents suitable for use according to the present invention is disclosed in U.S. Ser. No. 12/986,312, entitled Control of Hard Water Scaling in Electrochemical Cells. The entire contents of this patent application are hereby expressly incorporated herein by reference, including, without limitation, the specification, claims, and abstract, as well as any figures, tables, or drawings thereof.

The threshold agent utilized according to the invention prevents the scaling of the electrodes and membranes in electrochemical cells, namely the cathode of a cell. According to a preferred embodiment, the threshold agents according to the invention are water soluble polymeric systems capable of preventing hard water scale formation on both electrodes and resin or ceramic membranes. According to the invention, the threshold agents are compatible for inhibiting scaling caused by hard water deposits, particularly in systems supplied with water having high levels of carbonate, hydroxide and/or phosphate ions along with water hardness ions traditionally leading to buildup in cells causing the unsightly residue, film and scaling that is detrimental to cells. According to an embodiment of the invention, water impurities such as calcium and magnesium are not deleterious to the electrolytic water once threshold agents are utilized to prevent crystallization and scaling with bicarbonate, carbonate, hydroxide, sulfate and/or phosphate ions. Accordingly, use of the threshold agent of the present invention obviates the need to "soften" the water source used in an electrochemical cell.

According to a preferred embodiment, the threshold inhibiting agents may be a polycarboxylate or related copolymer. Polycarboxylates refer to compounds having a plurality of carboxylate groups. A variety of such polycarboxylate polymers and copolymers are known and described in patent and other literature, and are available commercially. Exemplary polycarboxylates that may be utilized as threshold inhibiting agents according to the invention include for example: homopolymers and copolymers of polyacrylates; polyacrylates; polymethacrylates; noncarboxylated materials such as polyolefinic and polymaleic copolymers, such as olefinic and maleic hydride copolymers; and derivatives and salts of all of the same.

Suitable polycarboxylates and related copolymers according to the invention may include water soluble polycarboxylate polymers, including for example homopolymeric and copolymeric agents. Additional suitable polycarboxylates may include homopolymeric and copolymeric agents, such as polymeric compositions with pendant ($-CO_2H$) carboxylic acid groups, including polyacrylic acid, polymethacrylic acid, polymaleic acid, acrylic acid-methacrylic acid copolymers, acrylic-maleic copolymers, hydrolyzed polyacrylamide, hydrolyzed methacrylamide, hydrolyzed acrylamide-methacrylamide copolymers, hydrolyzed polyacrylonitrile, hydrolyzed polymethacrylonitrile, hydrolyzed acrylonitrile methacrylonitrile copolymers, or mixtures thereof. According to a further embodiment, the water soluble salts or partial salts of these polymers and copolymers may further be suitable threshold agents according to the invention. Additional description of exemplary polycarboxylates is provided in U.S. Pat. No. 7,537,705.

Examples of oligomeric or polymeric polycarboxylates suitable as threshold agents include for example: oligomaleic acids as described, for example, in EP-A-451 508 and EP-A-396 303; co- and terpolymers of unsaturated C4-C8-dicarboxylic acids, possible co-monomers which may be present being monoethylenically unsaturated monomers from group (i) in amounts of up to 95% by weight, from group (ii) in amounts of up to 60% by weight, from group (iii) in amounts of up to 20% by weight. Examples of suitable unsaturated C4-C8-dicarboxylic acids include maleic acid, fumaric acid, itaconic acid and citraconic acid. Suitable co- and terpolymers are disclosed, for example, in U.S. Pat. No. 3,887,806.

The group (i) includes monoethylenically unsaturated C3-C8-monocarboxylic acids, such as acrylic acid, methacrylic acid, crotonic acid and vinylacetic acid, for example acrylic acid and methacrylic acid. Group (ii) includes monoethylenically unsaturated C2-C22-olefins, vinyl alkyl ethers with C1-C8-alkyl groups, styrene, vinyl esters of C1-C8-carboxylic acids, (meth)acrylamide and vinylpyrrolidone, for example C2-C6-olefins, vinyl alkyl ethers with C1-C4-alkyl groups, vinyl acetate and vinyl propionate. Group (iii) includes (meth)acrylic esters of C1-C8-alcohols, (meth)acrylnitrile, (meth)acrylamides of C1-C8-amines, N-vinylformamide and vinylimidazole.

Suitable polyacrylates, homopolymers and copolymers of polyacrylates, polyolefinic and polymaleic systems for threshold agents according to the invention may include organic compounds, including both polymeric and small molecule agents, including for example polyanionic compositions, such as polyacrylic acid compounds. Polymeric agents commonly comprise polyanionic compositions such as polyacrylic acid compounds. Polymers such as Acusol 448 (Rohm & Haas) and others are commercially available and may be useful according to the present invention. For example, exemplary commercially available acrylic-type polymers include acrylic acid polymers, methacrylic acid polymers, acrylic acid-methacrylic acid copolymers, and water-soluble salts of the said polymers. These include polyelectrolytes such as water soluble acrylic polymers such as polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, hydrolyzed methacrylamide, hydrolyzed acrylamide-methacrylamide copolymers, and combinations thereof. Such polymers, or mixtures thereof, include water soluble salts or partial salts of these polymers such as their respective alkali metal (for example, sodium or potassium) or ammonium salts can also be used. The weight average molecular weight of the polymers is from about 2,000 to about 20,000. According to a preferred embodiment, the threshold agent for use in the compositions and methods of the present invention is the commercially-available Acumer 1000.

According to an additional embodiment of the invention, sulfonated polymers may be used as the threshold agent for inhibiting scaling in an electrochemical cell. These may include a variety of sulfonated polymers and copolymers, such as for example, carboxylic sulfonated polymers and copolymers, carboxylic sulfonated nonionic terpolymers, sulfonated styrene/maleic acid copolymers and various other sulfonated polymers and copolymers as may be ascertained by those of ordinary skill in the art to which the invention pertains. Examples of suitable commercially available threshold agents include, for example: Acusol 588 and Acusol 420 (all available from Rohm & Haas).

One skilled in the art will understand the methods of synthesis of such polymers and co-polymers if commercially available threshold agents are not utilized. It is to be understood according to the threshold agents described herein, that such polymers refer to compositions produced by polymerization of one or more monomers with no restriction on the number of types of monomers incorporated in the polymer. Further it is to be understood that co-polymers refer to compositions produced according to a variety of known methods of polymerization with no restriction on the number of types of monomers incorporated in the polymer.

Although not intending to be limited according to a particular theory, the threshold agents suitable for use according to the present invention are preferably short chain polymers with low molecular weights that do not cause decreased chlorine production or increased voltage demand as a result of a large molecular weight and long chain interfering with electrical flow in an electrochemical cell. According to an embodiment of the invention, suitable threshold agents have a molecular weight less than at least 5,000, more preferably less than 4,000, more preferably less than 3,000 and according to a most preferred embodiment less than 2,000.

According to an additional embodiment of the invention, the threshold agent may be a water-insoluble resin. For example, a threshold agent may be obtained as the result of running water over a water-insoluble resin to release a water soluble polymeric threshold agent, such as a resin bead. A commercially-available resin bead is available from Dow® under the tradename Amberlyte IRC-76®, which represents a preferred embodiment of the invention. Additional suitable water-insoluble resins for generating threshold agents in a water source treated by an electrochemical cell are disclosed in U.S. Ser. No. 12/764,621 filed on Apr. 21, 2010 entitled "Methods and Apparatus for Controlling Water Hardness", the entire content of which is hereby incorporated by reference.

It is expected that other types of scale inhibitors meeting the requirements described herein according to the invention can be included with the threshold agent according to the invention, if desired. Particularly, additional scale inhibitors may be added to handle a particular type of scaling in a given application or environment, such as a unique water supply. One skilled in the art will ascertain the need for such additional scale inhibitors according to the invention.

It is desirable to provide the threshold agent in a concentration that is sufficient to provide a desired level of scale inhibition. According to the invention, the ratio of threshold agent to be added to a hypochlorite or chlorine-containing oxidant source or the ratio of threshold agent added to an electrochemical cell producing hypochlorite may vary. According to an embodiment, the threshold agent can be provided at a concentration up to about 10,000 ppm to achieve a desired level of scale inhibition. According to a preferred embodiment, the threshold agent can be provided at a concentration up to about 5,000 ppm or up to about 1,000 ppm. According to a still further preferred embodiment, the threshold agent can be provided in concentrations from about 50 to about 500 ppm. According to particular embodiments a most preferred concentration to provide a desired level of scale inhibition may be about 100 ppm threshold agent. According to the invention, the effective amounts of threshold agents utilized refers to an amount sufficient to provide an inhibitory effect on the water scaling in an electrochemical cell as compared with an identical composition and electrochemical cell that does not contain a sufficient amount of the threshold agent to inhibit such water scaling.

The threshold agent composition according to the invention may be formulated into a variety of composition formulations, such as for example a solid or a flowable liquid. According to one embodiment, the composition is incorporated into the salt feed for the electrochemical cell, forming a solution with the water source upon entry into the cell. The formulation of the threshold agent with the salt may be in either a flowable liquid incorporated into the salt feed for the electrochemical cell or solid form. According to an alternative embodiment, the solid composition may be a block, powder, or other pelleted material. According to an additional embodiment, the solid threshold agent may be provided in a block formulation to be added to an electrochemical cell for a slow or extended time-release of the threshold agent in a cell. Alternatively, the threshold agent may be introduced into the water feed for the electrochemical cell in either a solid or flowable liquid. According to further embodiments of the invention, the threshold agent may be added directly into the electrochemical cell as a separate feed from the water or salt.

Various threshold agent compositions are disclosed as embodiments of the invention. According to one aspect of the invention, a threshold agent may comprise, consist of or consist essentially of about 50 ppm to about 10,000 ppm of a threshold agent and may be combined with a catholyte and/or anolyte source, such as water or a detergent according to the invention. The threshold agent according to the invention is a water soluble polymeric system capable of preventing hard water scale formation on electrodes and membranes, preferably a polycarboxylate selected from the group consisting of homopolymers and copolymers of polyacrylates, polyolefinic systems, polymaleic systems, derivatives and salts of the same, and combinations of the same. According to a preferred embodiment, the polycarboxylate is Acumer 1000. The threshold agent may further be a product of rinsing a water insoluble resin with water.

According to the invention, the threshold agent may be formulated into a variety of composition formulations, such as for example a solid or a flowable liquid. In one embodiment, the threshold agent is added in the form of a liquid. In another embodiment, the threshold agent is in the form of a solid block which is then dispensed into a stream of water using a variety of solids dispensing systems known to the art. In an additional embodiment, the threshold agent is combined with the chemical feed for the electrochemical cell (for example, sodium chloride, sodium bicarbonate, and sodium carbonate). In another embodiment, the source of the threshold agent is from a weak cation exchange resin which has had its cation exchange capability exhausted by exposure to a source of calcium or magnesium or mixtures thereof. Exemplary exhausted weak cation exchange resins which can serve as a source of threshold agent to control water hardness are described in U.S. patent application Ser. No. 12/764,621 filed on Apr. 21, 2010, entitled "Methods and Apparatus for Controlling Water Hardness", the entire content of which is hereby incorporated by reference.

Catalytic Systems

According to additional embodiments of the invention, the water treatment component can include a catalytic system. Exemplary water treatment components including catalytic agents, systems and methods of using the same to reduce solubilized water hardness are described in U.S. patent application Ser. No. 12/764,606 filed on Apr. 21, 2010, entitled "Catalytic Water Treatment Method and Apparatus", the entire content of which is hereby incorporated by reference.

An embodiment of a catalytic system for use as a water treatment component according to the invention includes a treatment reservoir including one or more catalysts positioned therein. In some embodiments, the catalyst includes a water treatment agent bound to a supporting material, wherein the water treatment agent is selected from the group consisting of a source of magnesium, zinc, titanium and iron ions and combinations of the same. Optionally, the catalyst may include a source of aluminum. Optionally, the catalyst may be zinc-free.

Any material capable of supporting the water treatment agent can be used in the catalyst system for the water treatment component. Supporting material may be provided in any shape and size, including, beads, sheets, rods, disks or combinations of more than one shape. In addition, the catalyst may be bound to the support material in a variety of ways. For example, in some embodiments, the supporting material comprises a resin which may include, but is not limited to, a weak acid cation resin (e.g., an acrylic acid polymer, a methacrylic acid polymer, and mixtures thereof), a polymer having sulfonic acid substituents, a carboxylic acid polymer, and mixtures thereof. The catalyst can be ionically bound to the support medium in some embodiments, as well as combined with unbound additional ingredients. Additional function ingredients may be combined with the catalysts for use in the water treatment component, in any form, including for example metal oxides, metal hydroxides, polymorphs of calcium carbonate (non-calcite forms) and combinations and mixtures thereof.

The catalyst system for use with as a water treatment component according to an embodiment of the invention can be contained in a treatment reservoir. The reservoir may be any shape or size appropriate for the use of the water and the volume of water to be treated, including for example, a tank, a cartridge, a filter bed of various physical shapes or sizes, or a column. In some embodiments, the treatment reservoir may be pressurized or non-pressurized.

Conversion Agents

According to additional embodiments of the invention, the water treatment component can include a treatment reservoir including one or more conversion agents. Without wishing to be bound by any particular theory, it is thought that the conversion agents for use with the methods of the present invention cause solubilized calcium water hardness ions in water to substantially precipitate in a non-calcite crystalline form via an interfacial reaction that produces the thermodynamically unfavorable crystal form aragonite, rather than as the thermodynamically favorable crystal form calcite. Thus, contacting feed water with a conversion agent according to an embodiment of the invention reduces the solubilized water hardness of the treated water, and leads to a reduction in scale formation on a surface in contact with the treated water. The aragonite crystals can also act as seed crystals for further reduction of solubilized calcium after contacting the conversion agent.

Exemplary water treatment components including conversion agents, such as water soluble magnesium compounds, and methods of using the same are described in U.S. patent application Ser. No. 12/114,448, entitled "Water Treatment System and Downstream Cleaning Methods" and U.S. patent application Ser. No. 12/114,513, entitled "Cleaning Compositions Containing Water Soluble Magnesium Compound and Method of Using Them", the entire contents of which are hereby incorporated by reference.

In some embodiments, the conversion agent may be a solid particle. Conversion agents suitable for use with the present invention include, but are not limited to metal oxides, metal hydroxides, polymorphs of calcium carbonate and combinations and mixtures thereof. In some embodiments, the conversion agent includes a metal oxide. Metal oxides suitable for use in the present invention include, but are not limited to, magnesium oxide, aluminum oxide, titanium oxide, and combinations and mixtures thereof. Optionally, the conversion agent is free of aluminum. Optionally, the conversion agent is free of zinc. Metal hydroxides suitable for use with the present invention include, but are not limited to, magnesium hydroxide, aluminum hydroxide, titanium hydroxide, and combinations and mixtures thereof. Polymorphs of calcium carbonate suitable for use as a conversion agent include, but are not limited to, aragonite. In some embodiments, magnesium oxide, magnesium hydroxide, or a combination of magnesium oxide and hydroxide are used as a conversion agent to treat water. The conversion agent may be in any form, e.g., solid, particle, liquid, powder, nanoparticle, slurry, suitable for use with the methods and in situ cleaning systems of the present invention.

Certain embodiments of the invention use a magnesium source for the water treatment component. The composition can include magnesium ion at predefined ratios to calcium ion in water, such as magnesium ion in a molar amount equal to or in excess over a molar amount of calcium ion. It is preferred the water soluble magnesium salt can include an anion that, together with calcium ion, forms a water soluble calcium salt. For example, the present invention may include a soluble magnesium source provided to the feed water. According to an embodiment of the invention, use of a water soluble magnesium (a hardness ion ($Mg^{2+}$)) as a water treatment component works at least as well as a conventional chelating agent or sequestrant (i.e. sodium tripolyphosphate (STPP)) at preventing precipitation of calcium salts while actually increasing the overall water hardness.

Suitable water soluble magnesium compounds include those selected from the group consisting of magnesium acetate, magnesium benzoate, magnesium bromide, magnesium bromate, magnesium chlorate, magnesium chloride, magnesium chromate, magnesium citrate, magnesium formate, magnesium hexafluorosilicate, magnesium iodate, magnesium iodide, magnesium lactate, magnesium molybdate, magnesium nitrate, magnesium perchlorate, magnesium phosphinate, magnesium salicylate, magnesium sulfate, magnesium sulfite, magnesium tartrate, magnesium thiosulfate, a hydrate thereof, and a mixture thereof. These salts can be provided as hydrated salts or anhydrous salts. Water soluble magnesium compounds approved as GRAS for direct food contact, including for example, magnesium chloride and magnesium sulfate, can also be used.

The water treatment component including a conversion agent can further include additional functional ingredients. Additional functional ingredients suitable for use include any materials that impart beneficial properties to the conversion agent, the water source being treated, or any combination thereof. For example, in some embodiments the conversion agent includes a solid media bed of particles, e.g., magnesium oxide particles. Additional functional ingredients may be added that aid in the prevention of "cementing" of the media bed, i.e., agglomeration of the particles, as it is contacted with a water source. In still further embodiments, the additional functional ingredient includes a polymorph of calcium carbonate. Exemplary polymorphs of calcium carbonate include, but are not limited to, aragonite, calcite, vaterite and mixtures thereof. In other embodiments, the additional functional ingredient includes a mixed cation compound of calcium and magnesium ions. In some embodiments, the additional functional material includes calcium magnesium carbonate, some natural minerals of which may also be known by the name dolomite.

The conversion agent for use with the water treatment component according to the invention can be contained in a treatment reservoir in the water treatment component. The reservoir can be for example, a tank, a cartridge (such as a portable removable cartridge), a filter bed of various physical shapes or sizes, or a column. In some embodiments, the treatment reservoir including a conversion agent is resin-free, viz., it does not contain a material that contains univalent hydrogen, sodium or potassium ions, which exchange with divalent calcium and magnesium ions in the water source. The reservoir can be pressurized or not pressurized. One reservoir or multiple reservoirs can be used. For example, the water source can be passed over a plurality of reservoirs, in the same or in separate containers, comprising the same or different conversion agents. The reservoirs may also be arranged in series or in parallel.

In some embodiments, the conversion agent is in the form of an agitated bed or column. The bed or column can be agitated to avoid "cementing," i.e., agglomeration of the solid conversion agent once contacted with the water source. The bed or column can be agitated by any known method including, for example, by the flow of water through the column, fluidization, mechanical agitation, high flow backwash, recirculation, and combinations thereof. In some embodiments, the solid conversion agent includes a fluidized bed, e.g., a column or a cartridge, in the treatment reservoir. Fluidization is obtained by an increase in the velocity of the fluid, e.g., water, passing through the bed such that it is in excess of the minimum fluidization velocity of the media. In still further embodiments, the treatment reservoir comprises a portable, removable cartridge.

Resin Materials

In additional embodiments of the invention, the water treatment component may include a resin material to control water hardness without substantially altering the water source. A variety of resin materials may be used with the in situ cleaning systems of the present invention and embodiments are described in U.S. patent application Ser. No. 12/764,621 filed on Apr. 21, 2010 entitled "Methods and Apparatus for Controlling Water Hardness", the entire content of which is hereby incorporated by reference.

Various embodiments of the resin material may be incorporated into the water treatment component of the in situ cleaning system, including for example, exhausted resin materials, a resin substantially loaded with a plurality of one or more multivalent cations, substantially water insoluble resin material and acid cation exchange resin. In some embodiments, the resin material is an exhausted resin material. As used herein, the term "exhausted resin material" refers to an ion exchange resin material that can control water hardness, but that is incapable of performing an ion exchange function. In some embodiments, an exhausted resin material has a surface that is substantially loaded with a plurality of one or more multivalent cations, and is thus unable to exchange ions with a water source when contacted with a water source. The exhausted resin materials of the present invention do not control water hardness through an ion exchange mechanism. That is, the surface of an exhausted resin material is inert, as it is loaded with a plurality of multivalent cations.

In additional embodiments, the resin is substantially loaded with a plurality of one or more multivalent cations, which may include a mixture of calcium and magnesium ions. The calcium and magnesium ions may be loaded on to the resin material at a ratio of from about 1:10 to about 10:1, about 1:5 to about 5:1, about 1:3 to about 3:1, about 1:2 to about 2:1, or from about 1:1 of calcium ions to magnesium ions. In still further embodiments, a substantially water insoluble resin material is loaded with a plurality of cations.

Additional embodiments of the resin materials for the water treatment component include an acid cation exchange resin that may include a weak acid cation exchange resin, a strong acid cation exchange resin, and combinations thereof. Weak acid cation exchange resins suitable for use in the present invention include, but are not limited to, a cross linked acrylic acid polymer, a cross linked methacrylic acid polymer, and mixtures thereof. In some embodiments, resin polymers have additional copolymers added. The copolymers include but are not limited to butadiene, ethylene, propylene, acrylonitrile, styrene, vinylidene chloride, vinyl chloride, and derivatives and mixtures thereof.

The resin material for use in the invention may be provided in any shape and size, including beads, rods, disks or combinations of more than one shape. In some embodiments, the resin material is selected from the group consisting of a gel type resin structure, a macroporous type resin structure, and combinations thereof. In some embodiments, the resin material may have a particle size of from about 0.5 mm to about 1.6 mm and to as large as 5.0 mm. The resin material may also include a mixture of particle sizes, viz. a mixture of large and small particles. It is also to be understood that the resin material is contained within a treatment reservoir in some embodiments, wherein any reservoir capable of holding the water treatment composition may be used as a treatment reservoir.

Filtration Systems

According to additional embodiments of the invention, the water treatment component may include filtration systems. Any suitable filtration systems can be used in the in situ cleaning system for water treatment according to the invention. Filtration systems, including for example, ionic filtration systems, may be used to remove precipitates from feed water.

Alkalinity Generating Components—Decomposition Agents

According to an embodiment of the invention, the in situ cleaning system comprising an electrochemical cell further comprises, consists of or consists essentially includes an additional alkalinity generating component. According to an embodiment of the invention, an alkalinity generating component for further generation of alkalinity may includes any device or component capable of producing a source of alkalinity or resulting in an increase in the pH of a treated use solution, including for example a decomposition agent capable of catalyzing the decomposition of an oxidizing agent to form a source of alkalinity. Suitable decomposition agents and systems for alkalinity generating components according to the invention are further described U.S. patent application Ser. Nos. 12/780,407 and 12/780,453 entitled "Compositions, Systems and Method for In Situ Generation of Alkalinity," and Ser. No. 12/780,503 entitled "Peroxygen Catalyst-Containing Fabric and Use for In Situ Generation of Alkalinity," the entire contents of which are hereby incorporated by reference.

Without wishing to be bound by any particular theory of the invention, the decomposition agent catalyzes the decomposition of a peroxygen source that may be produced by an electrochemical cell, generating alkalinity. The decomposition agent may further facilitate the decomposition of the peroxygen source, preferably a dilute peroxygen source. Still further, the decomposition agent causes bubbling useful for improved cleaning, such as removal of soil from hard surfaces. Production of alkalinity in situ allows for the use of cleaning compositions, such as cleaning concentrates, having decreased levels of alkalinity in applications which require higher levels of alkalinity as the decomposition agent and the peroxygen source can be brought into contact, generating alkalinity at the desired time of use.

The decomposition agent according to the invention may include various substances as well as the use of one or more decomposition agents for a cleaning composition. The decomposition agent according to the invention is not consumed by the reaction with the peroxygen source. Accordingly, it is an embodiment of the invention that the decomposition agent does not need to be replaced and is be reusable in combination with various support media. In some embodiments, the decomposition agent may have activity as a bleach activator in the presence of a bleachable substrate and as a decomposition agent for the increase of alkalinity from the decomposition of a peroxygen source in the absence of a bleachable substrate. In further embodiments, the decomposition agent of the reduced alkalinity cleaning composition is metallic. Examples of decomposition agents include various forms of metallic manganese, silver, and vanadium.

According to preferred embodiments the decomposition agent includes at least one source of manganese. In some embodiments, the manganese source is derived from manganese metal, manganese oxides, colloidal manganese, inorganic or organic complexes of manganese, including manganese sulfate, manganese carbonate, manganese acetate, manganese lactate, manganese nitrate, manganese gluconate, manganese chloride or commercially available as Dragon A350 (also known as Dragon's Blood, available from Rahu Catalystics of Nottingham, U.K.), or any of the salts of salt forming species with manganese.

According to a further preferred embodiment, the decomposition agent includes at least one source of silver. In some embodiments, the silver source is derived from silver metal, silver oxides, silver hydroxide, colloidal silver, inorganic or organic complexes of silver, water-soluble or insoluble silver salts, including silver sulfate, silver carbonate, silver acetate, silver lactate, silver nitrate, silver gluconate, or silver chloride, or any of the salts of or salt forming species with silver. According to a still further embodiment, the decomposition agent includes at least one source of vanadium.

According to the invention, the decomposition agent is substantially free of iron, which may slow down the rate or counteract the activity of the decomposition agent according to the invention. In some embodiments, the decomposition agents may be soluble in water, slightly soluble in water, form a suspension in water or insoluble in water. According to further embodiments, the decomposition agent is provided in its solid, naturally occurring form. For example, the metallic silver decomposition agent according to an embodiment of the invention may be provided as a solid piece of silver. In other embodiments, the decomposition agent can be deposited onto or into a catalyst support matrix.

According to the invention, increasing the concentration of the decomposition agent results in a faster rate of pH increase. In some embodiments of the invention, the decomposition agent has a concentration in a cleaning composition without a support medium from about 0.5 ppm to about 10 wt-%. In some embodiments, the decomposition agents are present at about 1 ppm to about 5 wt-%, or from about 50 ppm to about 2 wt-%. In further embodiments of the invention, the decomposition agent has a concentration in a cleaning composition when present on a support medium from about 1 wt-% to about 100 wt-%. In some embodiments, the decomposition agents are present at about 5 wt-% to about 50 wt-%, and in other embodiments at about 10 wt-% to about 30 wt-%. It is to be understood that all values and ranges between these values and ranges are encompassed by the invention. According to a further embodiment, one or more promoters may be used in combination with a decomposition agent. Decomposition promoters suitable for use with the present invention include, but are not limited to, a magnesium ion source, a copper ion source, a zinc ion source, and mixtures thereof.

In some embodiments, the decomposition agent is provided on a support medium. Any support medium, i.e., substrate, which is compatible with the selected decomposition agent can be used. For example, the support medium can include, but is not limited to, a fabric, a pad, a sponge, an inorganic particle, a foam, and combinations thereof. The support medium can be any water insoluble inert support such as a support bed, for example. For example, the support bed can include a source of captive, water insoluble alkalinity. Additional examples of the support medium can include, but are not limited to, magnesium oxide, magnesium hydroxide, zinc oxide, titanium oxide, aluminum oxide, silicon oxide, alumino-silicate, ceramic, or polymeric material. The decomposition agent can be adhered to the support medium by any means known in the art. For example, the decomposition agent can be adhered to the support medium by physical absorption or by ionic exchange. According to other embodiments, the decomposition agent is bound to or adhered to a fabric. Examples of fabric which can be used include sponges, non woven materials, woven materials, cotton or other natural sources, polyester, polyamide, polyolefin, extruded films and laminates. The decomposition agent can be adhered to the fabric by any means known in the art.

Other suitable support media include particles that have been loaded with the decomposition agent. Exemplary particles include, but are not limited to, carbon, ion exchange resin, silicates, sand, aluminum oxide, metal oxides, and/or combinations thereof. Metal oxides suitable for use in the methods of the present invention include zinc oxide, magnesium oxide, titanium oxide, and combinations thereof. In some embodiments, the support medium is substantially free of aluminum oxide. In some embodiments, the decomposition agent may be provided in a cartridge or a column in the alkalinity generating component. The cartridge includes one or more inlets and one or more outlets and contains the decomposition agent. The cartridge can also include the support medium to which the decomposition agent can be bound. The decomposition agent can also be loose within the cartridge. In some embodiments, the cartridge contains fibers which include the decomposition agent, such as loose fibers of silver.

Additional Ingredients

Embodiments of the invention may further include an additional ingredient inlet in fluid communication with the in situ cleaning system, such as the outlet. Any ingredient which would be useful for a particular washing system or method of use according to the invention may be used. The additional ingredient used in embodiments of the invention may be a liquid or a solid. For example, the additional ingredient can include, but is not limited to, one or more of the following: inorganic additives; builders, e.g., chelating/sequestering agents; threshold agents, organic additives; surfactants; rinse aids; bleaching agents (oxy- or active halogen); bleach catalysts; sanitizers/antimicrobial agents; activators; defoaming agents; solidification agents; anti-redeposition agents; optical brighteners; dyes; odorants; hardening agents; solubility modifiers; corrosion inhibitors; magnesium sources or resins (water soluble or insoluble); enzymes and combinations thereof, as well as a variety of other materials, depending upon the desired characteristics and/or functionality of the cleaning agent for use in the washing system according to the invention.

All publications and patent applications in this specification are indicative of the level of ordinary skill in the art to which this invention pertains. All publications and patent applications are herein incorporated by reference to the same extent as if each individual publication or patent application was specifically and individually indicated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description.

Example 1

Comparison of Cell Set-Ups for Conversion of Soda Ash into Caustic

A two compartment cell was set-up in a variety of ways to determine the types of electrodes to be used in each chamber of an electrochemical cell. A two compartment cell was set-up using titanium and stainless steel as the electrode pair and Nafion 324 (commercially available from Dupont®) as the cation exchange membrane. The amps were fixed at 4A and the resulting voltage allowed to float.

Both water and an aqueous solution of 20% soda ash were eluted through the different sides of the cell to determine the best catholyte source for the cell. As the water and an aqueous solution of 20% soda ash were eluted through the different sides of the cell the changes in pH of the water monitored. The titanium was most effective as the cathode and stainless steel as the anode. As shown in FIG. 1, the pH increase of the water was maximized when water was utilized as the catholyte.

Example 2

Figure 2:
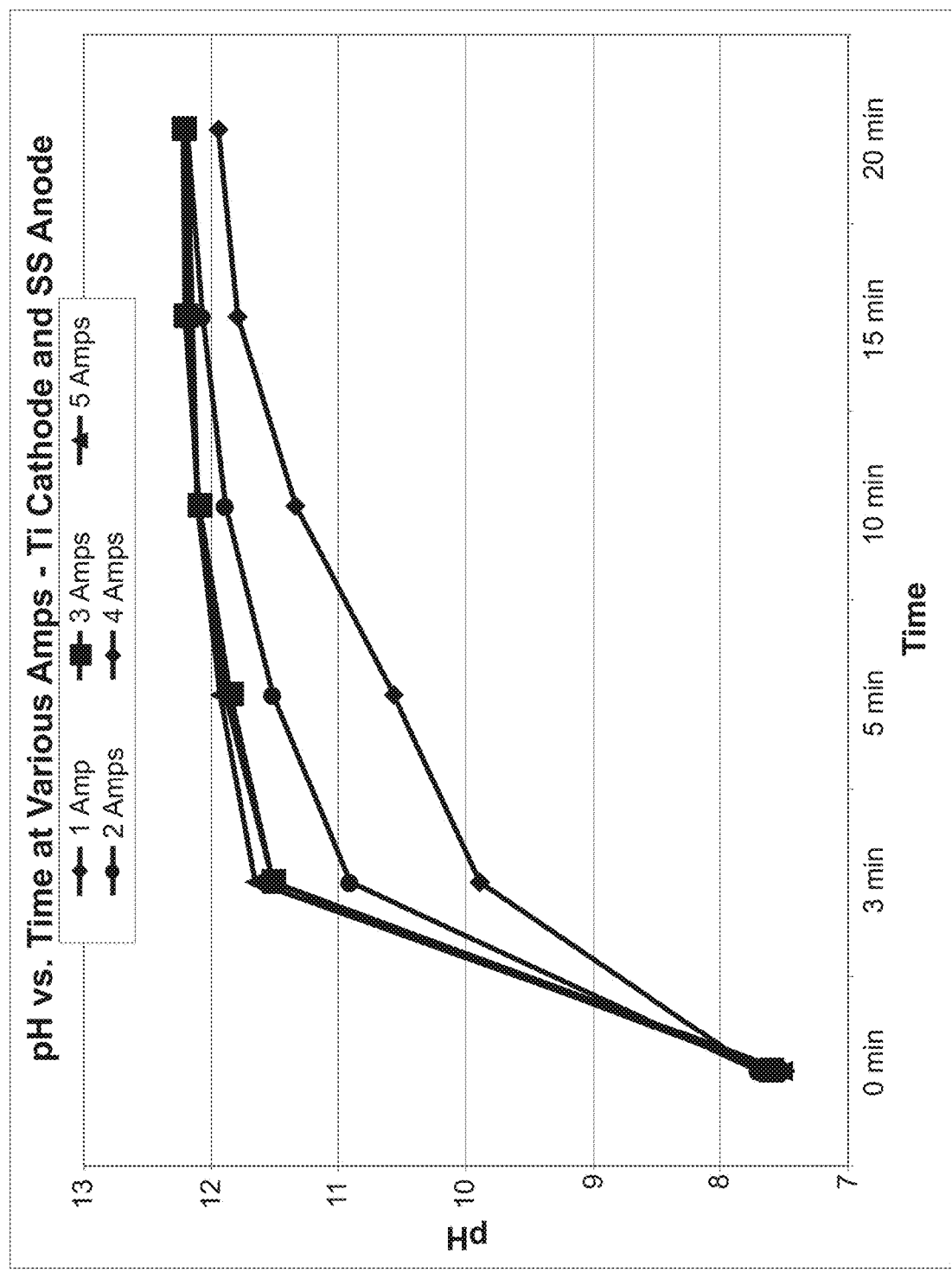
FIG. 2 shows the amperage required for most efficient pH increase in an electrochemical cell.

The preferred cell design of Example 1 (titanium cathode and water as catholyte) was further evaluated to determine the power required for the desired increase in pH. The amperage of the titanium cathode/water catholyte system of Example 1 was further evaluated to determine the amount of amps needed to provide the most efficient pH increase. As shown in FIG. 2, between 3-5 amps provided nearly equivalent and equally effective increases in pH (exceeding pH 12) using the cell design of Example 1. According to the tested system, 3 amps provides the amount of power at which there is a diminishing return for a system.

Example 3

Figure 3:
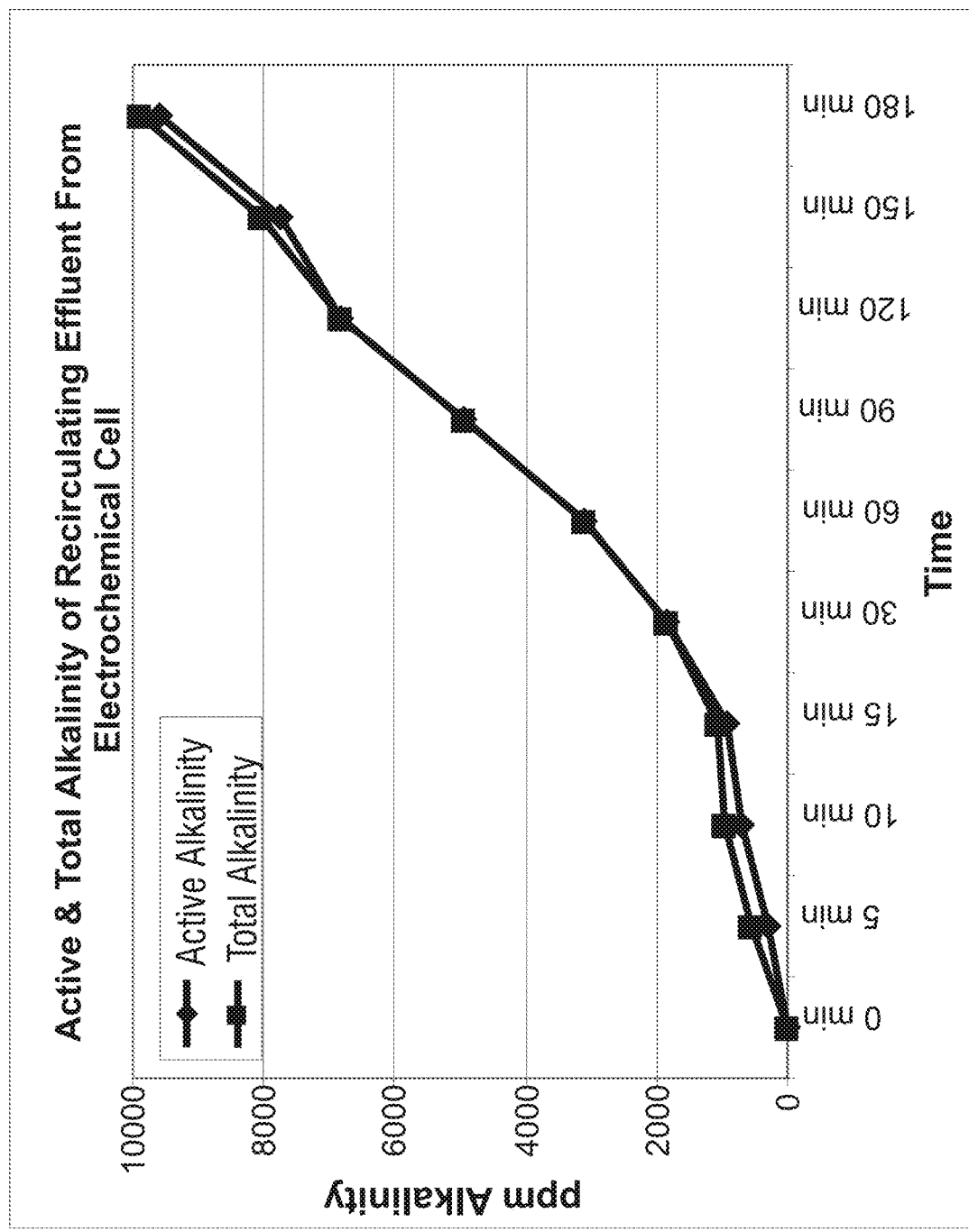
FIG. 3 shows the active and total alkalinity of recirculating effluent from an electrochemical cell.
Figure 4:
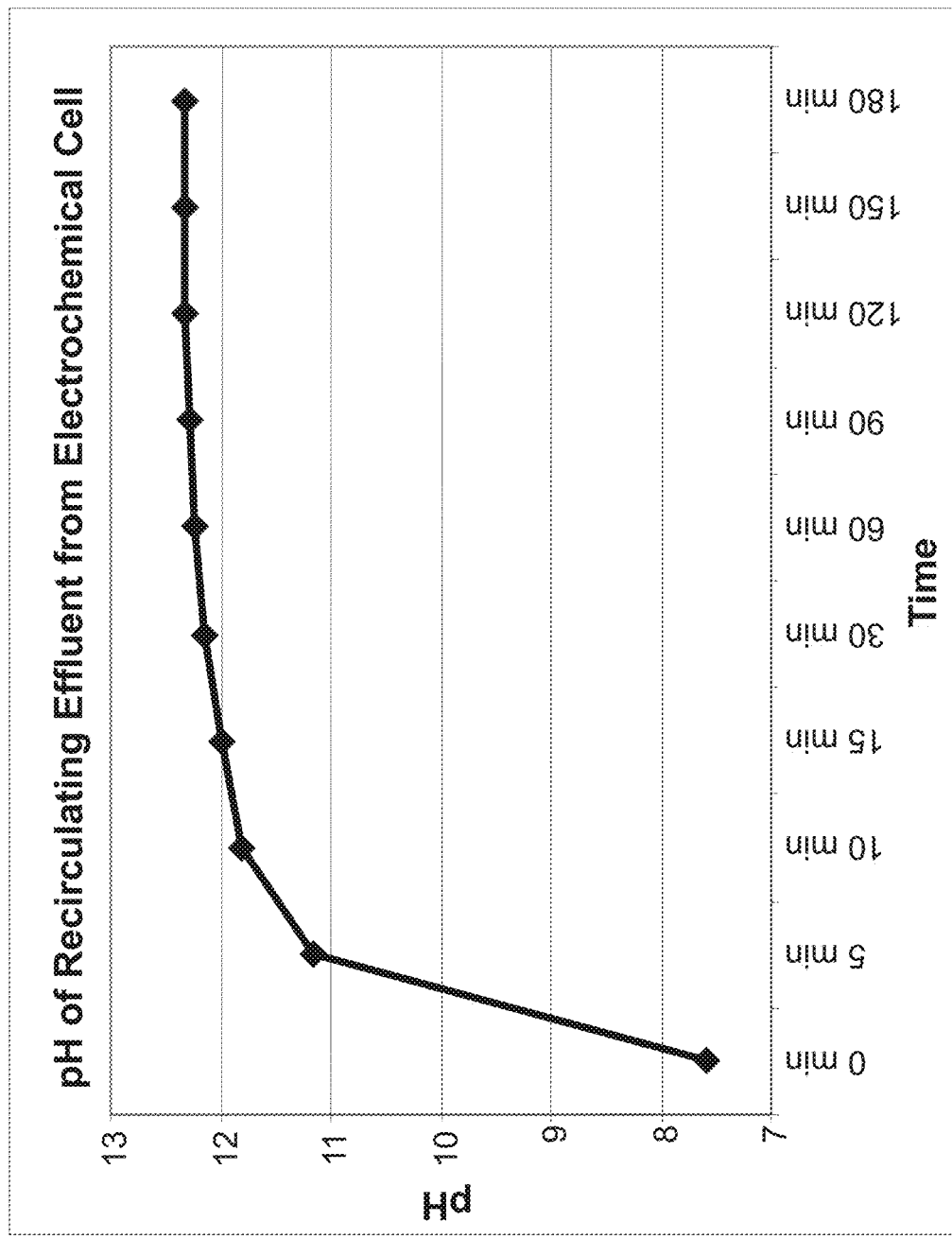
FIG. 4 shows the pH of the alkalinity recirculating in the electrochemical cell with the active and total alkalinity shown in FIG. 3.

The preferred cell design of Examples 1 and 2 (titanium cathode and water as the catholyte at 4 amps) was evaluated to determine the rate of alkalinity increase versus the type of alkalinity produced. FIG. 3 shows a graph of the type of alkalinity produced by the electrochemical cell. Active alkalinity is measured by a titration for sodium hydroxide, whereas total alkalinity is measured by a titration for sodium hydroxide and carbonate. The measurements were taken regardless of the production rate and show that nearly all of the alkalinity produced according to the invention is active alkalinity. FIG. 4 shows the pH of the recirculating effluent obtained from the same electrochemical cell.

Example 4

Generation of Alkalinity in a Ready to Use Ware Wash Detergent

The preferred electrochemical cell design and conditions of Examples 1-3 were used to generate alkalinity in a 2000 ppm use solution of APEX LP® ware wash detergent (commercially available from Ecolab®). APEX LP® is a solid ware wash detergent with approximately 65-68% soda ash. The 2000 ppm use solution of APEX LP® ware wash detergent, representative of a detergent concentration used for various cleaning applications, including ware wash applications, was substituted for the water (catholyte) in Examples 1-3. The anolyte was 20% sodium carbonate.

Figure 5:
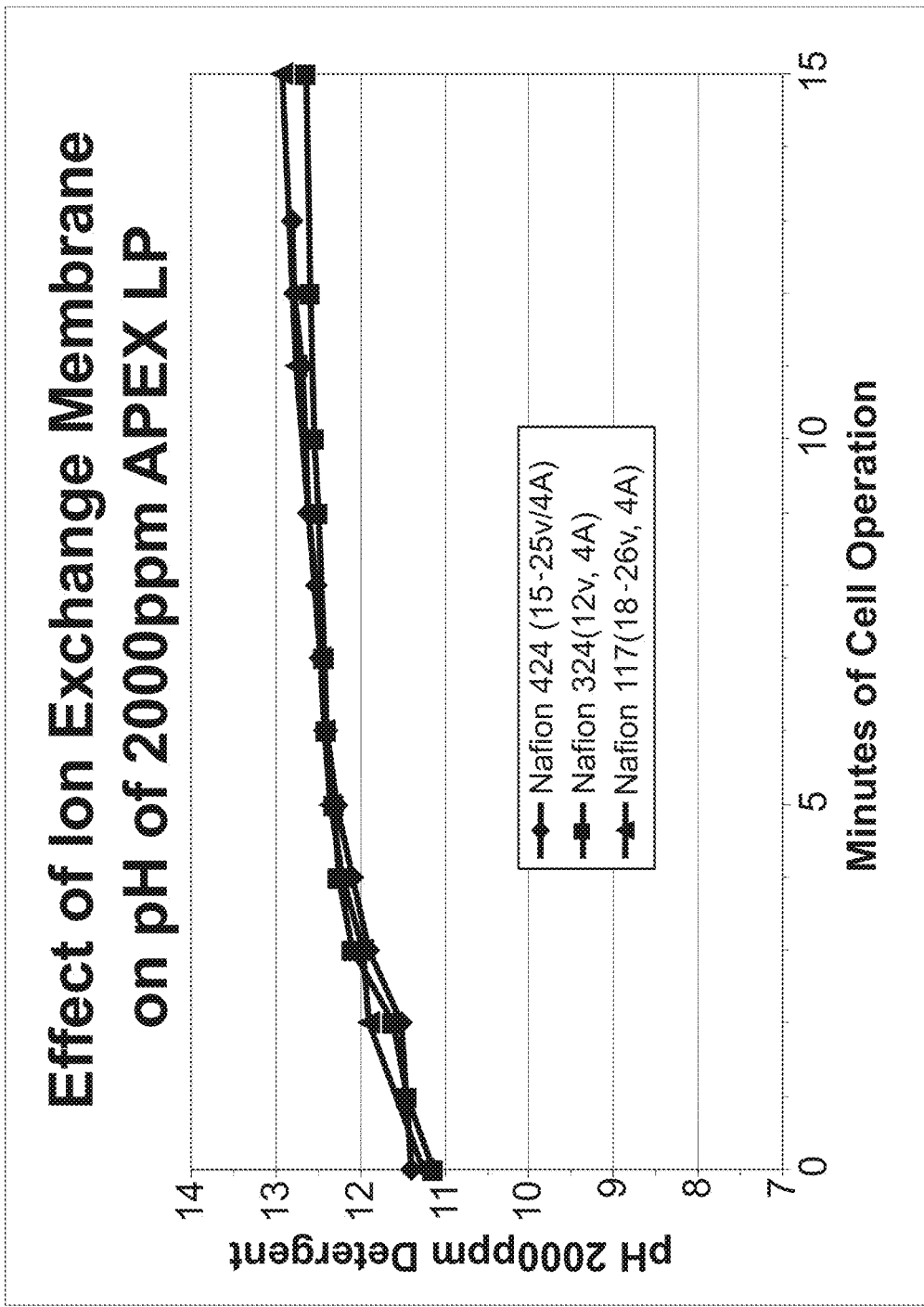
FIG. 5 shows the production of caustic using a detergent source and various cation exchange membranes.

Various membranes were tested according to the electrochemical cell design and conditions of Examples 1-3. Nafion 324, Nafion 424 and Nafion 117 cation exchange membranes were tested to determine the impact of the detergent on the various cation exchange membranes. FIG. 5 shows the generation of caustic proceeded well with a ware wash detergent solution substituted for the catholyte water stream of Examples 1-3. The pH of the APEX LP® ware wash detergent increased from approximately 11 to approximately 13 using the electrochemical cell to enhance the detergent alkalinity according to the invention demonstrating the ability of the invention to increase the alkalinity of detergent compositions. According to an embodiment of the invention a detergent composition is suitable for use with a dispenser to provide to an electrochemical cell according to the invention.

Example 5

Figure 6:
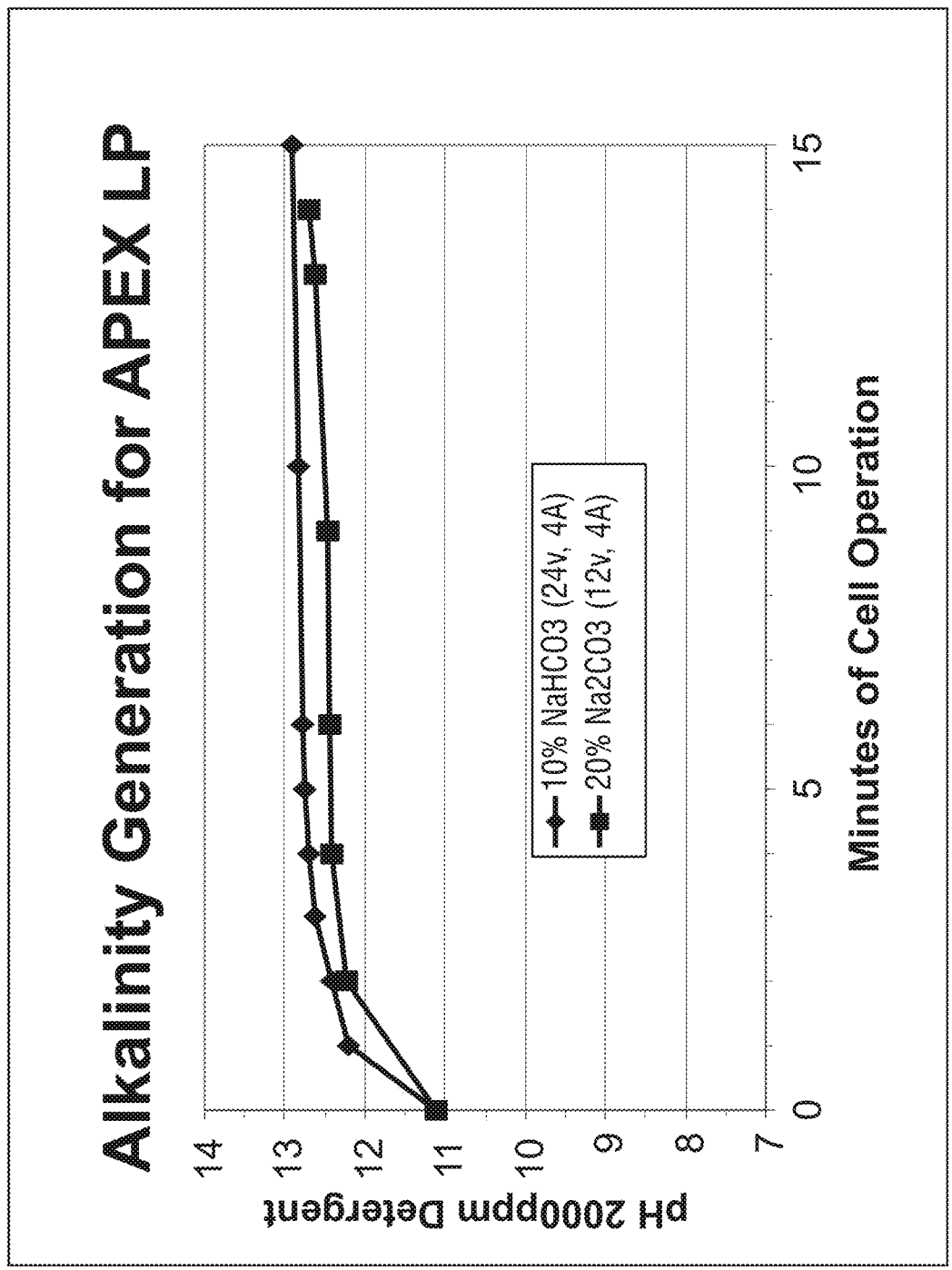
FIG. 6 shows the production of caustic using a detergent source and various anolyte solutions.

Comparison of Sodium Carbonate Vs. Sodium Bicarbonate in Ready to Use Solution of Ware Wash Detergent The methods of Example 4 were replicated using a Nafion 324 cation exchange membrane and 4 amps (allowing voltage to float). A saturated solution of sodium bicarbonate (approximately 10%) was substituted for the 20% sodium carbonate anolyte of Example 4. FIG. 6 shows that either sodium bicarbonate or sodium carbonate can be used to generate in situ alkalinity in a detergent solution. In addition, it is expected that mixtures thereof can further be used to generate in situ alkalinity in a detergent solution.

Example 6

Generation of Alkalinity in a Laundry Detergent Sump Solution

Example 4 was replicated using the Nafion 324 cation exchange membrane. A 10% sump solution of a laundry detergent, Formula 1 (commercially available from Ecolab®) was used in place of the ready to use APEX LP® ware wash detergent. Formula 1 is an aqueous slurry ware wash detergent with approximately 20% soda ash (as opposed to the approximately 65-68% soda ash in APEX LP®). The decreased concentration of soda ash in the detergent formulations did not result in any decrease in pH of caustic produced according to the electrochemical cell and methods of the invention. However, increased voltage demand was observed with the decreased concentration of soda ash.

Figure 7:
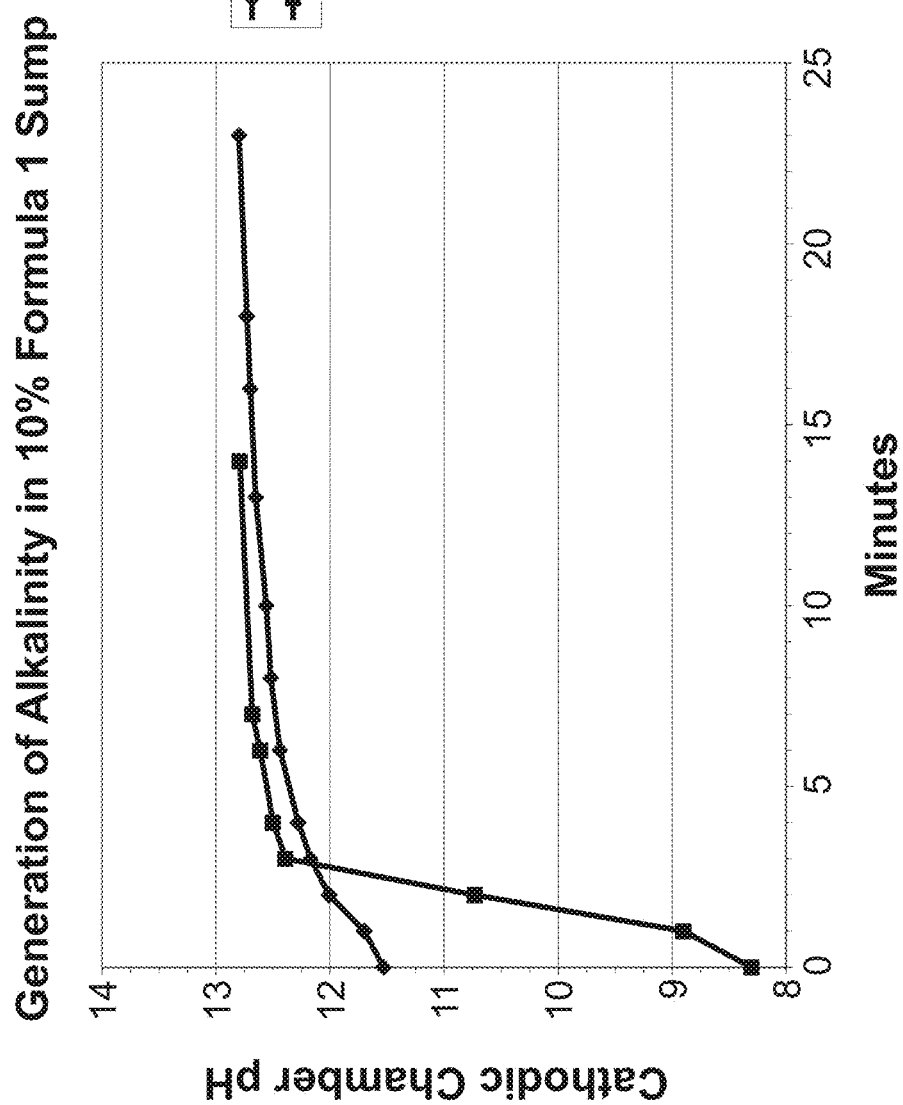
FIG. 7 shows the production of a neutral pH super-concentrate suitable to produce caustic in an electrochemical cell.

The experimentation further demonstrated that sodium bicarbonate can be used as a soda ash source. As shown, the carbonate source incorporated into the detergent was not converted; rather the bicarbonate (or carbonate) on the other side of the electrochemical cell was converted. As shown by FIG. 7, the electrochemical cell rapidly generated caustic which increased the alkalinity of the sump solution.

It was further demonstrated in FIG. 7 that the approximately 20% soda ash in the Formula 1 detergent could be removed without impacting the rate of alkalinity increase in the detergent. The soda ash was removed from one formulation of the Formula 1 ware wash detergent causing the pH of the detergent to decrease from approximately 11 to approximately 8. The same enhanced alkalinity detergent was produced for both sources of Formula 1 used in the electrochemical cell, resulting in a product having a pH of approximately 13. In effect, this allows the in situ preparation of an alkaline detergent from a neutral pH superconcentrate.

What is claimed is:

1. A method for increasing alkalinity of a detergent comprising:
   (a) providing an electrochemical cell configured with at least one hydrogen consuming anode, at least one hydroxide producing cathode and an ion-selective membrane;
   (b) introducing an electrolyte solution into said electrochemical cell, wherein said solution comprises:
      (i) a catholyte, wherein said catholyte is water or a detergent composition, wherein said detergent compositions is carbonate free prior to electrochemical alkalinity enhancement; and
      (ii) an anolyte, wherein said anolyte is an alkali metal carbonate, alkali metal bicarbonate, alkali metal sesquicarbonate or mixtures thereof; and
   (c) applying an electric current across said anode and cathode for electrochemical production of hydroxide and hydrogen at said cathode and carbon dioxide and water at said anode, wherein said method increases the pH of the catholyte;
   wherein the pH of the detergent is increased to at least 12.

2. The method of claim 1 wherein said catholyte is a detergent composition.

3. The method of claim 1 wherein said catholyte is water and further comprising introducing said hydroxide produced by said electrochemical cell to a detergent composition outside of said electrochemical cell.

4. The method of claim 1 wherein after electrochemical alkalinity enhancement, the detergent comprises an alkali metal carbonate, alkali metal bicarbonate, alkali metal sesquicarbonate or mixtures thereof.

5. The method of claim 1 further comprising adding a threshold agent to said electrochemical cell in the amount of up to about 10,000 ppm, wherein said threshold agent is a water soluble polycarboxylate having a molecular weight less than 5,000 selected from the group consisting of homopolymers and copolymers of polyacrylates, polyolefinic systems, polymaleic systems, derivatives and salts of the same, and combinations of the same.

6. The method of claim 1 further comprising adding at least one additional component to said electrolyte solution or detergent composition selected from the group consisting of a builder, threshold agent, surfactant, rinse aid, bleaching agent, bleach catalyst, sanitizer or antimicrobial agent, defoaming agent, solidification agent, anti-redeposition agent, optical brightener, dye, odorant, hardening agent, solubility modifier, corrosion inhibitor, magnesium sources or resins, enzyme or combinations thereof.

7. A device for in-situ production of caustic and increasing alkalinity of a detergent comprising:
   (a) an electrochemical cell configured with at least one hydrogen consuming anode, at least one hydroxide producing cathode and an ion-selective membrane, wherein an electric current is applied across said anode and cathode for electrochemical production of hydroxide and hydrogen at said cathode and carbon dioxide and water at said anode, to increase the pH of the catholyte;
   (b) an electrolyte solution source for said electrochemical cell, wherein said solution comprises:
      (i) a catholyte, wherein said catholyte is water or a detergent composition, wherein said detergent composition is carbonate free prior to electrochemical alkalinity enhancement; and (ii) an anolyte, wherein said anolyte is an alkali metal carbonate, alkali metal bicarbonate, alkali metal sesquicarbonate or mixtures thereof; and (c) an outlet for dispensing a product stream of either caustic or detergent having an increased pH of at least 12 exiting from the electrochemical cell.

8. The device of claim 7 wherein said ion-selective membrane is a micro porous membrane, micro porous diaphragm or a cation exchange membrane.

9. The device of claim 7 wherein said anode is steel and said cathode is titanium.

10. The device of claim 7 further comprising a dispenser in fluid communication with said electrochemical cell, wherein said dispenser provides an electrolyte solution comprising a detergent composition with a source of an alkali metal carbonate, alkali metal bicarbonate, alkali metal sesquicarbonate or combinations thereof.

11. The device of claim 7 further comprising a dispenser in fluid communication with said outlet and product stream of caustic, wherein said dispenser provides a detergent composition, and wherein said outlet is in fluid communication with a cleaning system such as a ware wash machine.

12. The device of claim 7 wherein said catholyte is a detergent composition.

13. The device of claim 7 wherein said electrolyte solution further comprises a threshold agent in the amount of up to about 10,000 ppm, wherein said threshold agent is a water soluble polycarboxylate having a molecular weight less than 5,000 selected from the group consisting of homopolymers and copolymers of polyacrylates, polyolefinic systems, polymaleic systems, derivatives and salts of the same, and combinations of the same.

14. The device of claim 7 wherein said electrolyte solution or detergent composition further comprises a source of a builder, threshold agent, surfactant, rinse aid, bleaching agent, bleach catalyst, sanitizer or antimicrobial agent, defoaming agent, solidification agent, anti-redeposition agent, optical brightener, dye, odorant, hardening agent, solubility modifier, corrosion inhibitor, magnesium sources or resins, enzyme or combinations thereof.

15. The method of claim 1, wherein the electric current is applied across said anode and cathode for at least 10 minutes.

16. The method of claim 1, wherein the anode is steel and the cathode is titanium.

* * * * *